United States Patent
Iwamoto (10) Patent No.: US 7,440,218 B2
(45) Date of Patent: Oct. 21, 2008

(54) CHARGE REMOVER FOR MAGNETIC DISK

(75) Inventor: Tohru Iwamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/508,005

(22) Filed: Aug. 22, 2006

(65) Prior Publication Data
US 2007/0268607 A1    Nov. 22, 2007

(30) Foreign Application Priority Data
May 19, 2006    (JP)    ............... 2006-140460

(51) Int. Cl.
G11B 21/02    (2006.01)
G11B 15/46    (2006.01)
G11B 5/596    (2006.01)

(52) U.S. Cl. .............. 360/75; 360/73.01; 360/78.04

(58) Field of Classification Search .......... None
See application file for complete search history.

(56) References Cited

U.S. PATENT DOCUMENTS 4,058,846 A * 11/1977 Knutson et al. .......... 360/121
6,324,031 B1 * 11/2001 Comstock et al. ........ 360/97.02
6,686,673 B1 * 2/2004 Komura et al. ............ 310/90
2006/0034016 A1 * 2/2006 Kameyama .............. 360/235.8

FOREIGN PATENT DOCUMENTS

| JP | 61-170958 | 8/1986 |
| JP | 01-119957 | 5/1989 |
| JP | 03-232169 | 10/1991 |

* cited by examiner

Primary Examiner—Joseph Feild
Assistant Examiner—Jason Olson
(74) Attorney, Agent, or Firm—Greer, Burns & Crain, Ltd

(57) ABSTRACT

A loading/unloading type magnetic disk unit includes a magnetic disk that is rotated or driven by a motor, and a head slider bearing a magnetic head and being movable above the magnetic disk owing to a driving mechanism. Herein, at least one projection made of a highly conductive material is formed on the surface of the head slider opposed to the magnetic disk. When the magnetic disk unit is in operation, conduction to the spindle motor is discontinued after the elapse of a predetermined time. Thus, the height by which the head slider floats is decreased so that the projections come into contact with the magnetic disk. Consequently, a charge on the magnetic disk escapes through the housing of the magnetic disk unit via the head slider. Thus, when the loading/unloading type magnetic disk unit is in operation, a charge on the magnetic disk can be removed.

15 Claims, 10 Drawing Sheets

CHARGE REMOVER FOR MAGNETIC DISK

CROSS-REFERENCE TO RELATED APPLICATION

This application claims priority from, and incorporates by reference the entire disclosure of, Japanese Patent Application No. 2006-140460 filed on May 19, 2006.

BACKGROUND OF THE INVENTION

1. Field of the Invention

The present invention relates to a control device capable of removing a charge on a magnetic disk when a magnetic disk unit, which includes a loading/unloading mechanism that keeps a magnetic head and a magnetic disk from coming into contact with each other when a power supply is turned off, is in operation, and to a magnetic disk unit including the control device.

2. Description of the Related Art

Conventionally, storage of data in a computer is achieved by a main memory that is a memory unit realized with a semiconductor device. Unless power is supplied, information stored in the main memory disappears. Data is therefore preserved in an external storage device. A magnetic disk unit is often adopted as the external storage device. As the magnetic disk unit, a hard disk drive, including at least one data storage disk coated with a magnetic substance and a magnetic head with which data is read or written on or from the disk, has become the mainstream device because of its large storage capacity. Each disk has a laminated structure having an aluminum or a glass disk base, which is coated with the magnetic substance. The disk is rotated at high speed, using a motor, so that the magnetic head can read or write data.

A hard disk drive can be a hard disk drive of a contact start/stop (CSS) type and a hard disk drive of a loading/unloading type. In the CSS type, when a magnetic disk is halted, a magnetic head is in contact with the magnetic disk. When the magnetic disk is rotated, the magnetic head floats above the magnetic disk. When the rotation of the magnetic disk is ceased, the magnetic head comes into contact with the magnetic disk. In the CSS type, the magnetic head lands in an internal circumferential zone (CSS zone) other than a zone on the magnetic disk in which the data is written. A head slider bearing the magnetic head has projections to prevent, when the magnetic head lands on the magnetic disk, the entire surface of the slider coming into contact with, and being adsorbed by the disk.

As far as the CSS type is concerned, when the power supply of the magnetic disk unit is turned off, the magnetic head or head slider comes into contact with the magnetic disk in the CSS zone. Consequently, a charge on the magnetic disk flows into the base of the magnetic disk unit via the magnetic head or head slider and a head suspension, and is thus removed. Therefore, in the CSS type, after the power supply of the magnetic disk unit is turned off, a charge will not accumulate on the magnetic disk.

On the other hand, the loading/unloading type is such that, when a magnetic disk is halted, a magnetic head is fully separated (unloaded) from the magnetic disk, and held in a holder located outside an outermost circumferential recording zone on the magnetic disk. When the magnetic disk is rotated, the magnetic head is returned to (loaded onto) the magnetic disk. Japanese Unexamined Patent Publication No. 3-232169 describes a hard disk drive of the loading/unloading type that removes foreign matter, which adheres to the magnetic head, during the use of the hard disk drive.

In the magnetic disk unit of the loading/unloading type, once the magnetic disk unit is started, and even when the power supply is turned off, the magnetic disk (medium) and magnetic head do not come into contact with each other. Therefore, a charge on the magnetic disk cannot escape. As the amount of charge increases, the superficial potential of the magnetic disk rises. This poses a problem in that a giant magneto-resistive (GMR) or magneto-resistive (MR) element included in the magnetic head may be broken due to static electricity.

SUMMARY OF THE INVENTION

An object of the present invention is to provide a control device for a loading/unloading type magnetic disk unit capable of, after the power supply of the magnetic disk unit is turned on and when a magnetic disk is rotated and a magnetic head starts reading or writing data from or on the magnetic disk, removing the charge on the magnetic disk. Another object of the present invention is to provide a magnetic disk unit, serving as a storage device, which includes the control device.

According to the first aspect of the present invention that accomplishes the object, a magnetic disk unit includes a motor that rotates or drives at least one disk, a head slider attached to the distal end of an arm movable above the disk, a loading/unloading mechanism that loads or unloads the head slider onto or from the disk, and a control device that, when the disk unit is in operation, discontinues conduction to the motor after the elapse of a predetermined time, and brings the head slider into contact with the disk so that the charge on the disk will escape through the arm.

Moreover, according to the second aspect of the present invention that accomplishes the object, a control device for a disk unit including a motor that rotates or drives at least one disk, a head slider attached to the distal end of an arm movable above the disk, and a loading/unloading mechanism that loads or unloads the head slider onto or from the disk includes a circuit that detects whether the disk unit is in operation, a circuit that, when the disk unit is in operation, detects the elapse of a predetermined time, and a circuit that discontinues conduction to the motor every after the elapse of the predetermined time so that the head slider will come into contact with the disk so as to cause the charge on the disk to escape through the arm.

According to the present invention, as far as a magnetic disk unit of a loading/unloading type is concerned, after the magnetic disk unit is started, a charge on the magnetic disk can be removed cyclically. This results in provision of a control device that does not cause a crash between the magnetic disk and magnetic head derived from static electricity and that is highly durable. Moreover, according to the present invention, there is provided a magnetic disk unit including the control device.

BRIEF DESCRIPTION OF THE DRAWINGS

The present invention is illustrated by way of example in, but is not limited by, the figures of the accompanying drawings in which like references indicate similar elements. Note that the following figures are not necessarily drawn to scale.

FIG. 10A shows a characteristic curve indicating a transition in the superficial potential of a magnetic disk, which is derived from a charge on the magnetic disk, in relation to a time elapsed since the power supply of a conventional magnetic disk unit is turned on.

FIG. 10B shows a characteristic curve indicating a transition in the superficial potential of a magnetic disk, which is derived from a charge on the magnetic disk, in relation to a time elapsed since the power supply of a magnetic disk unit, in accordance with the present invention, is turned on.

DESCRIPTION OF THE PREFERRED EMBODIMENTS

Before describing the preferred embodiments, an explanation will be given of the conventional antistatic mechanism shown in FIGS. 1A and 1B.

Figure 1A:
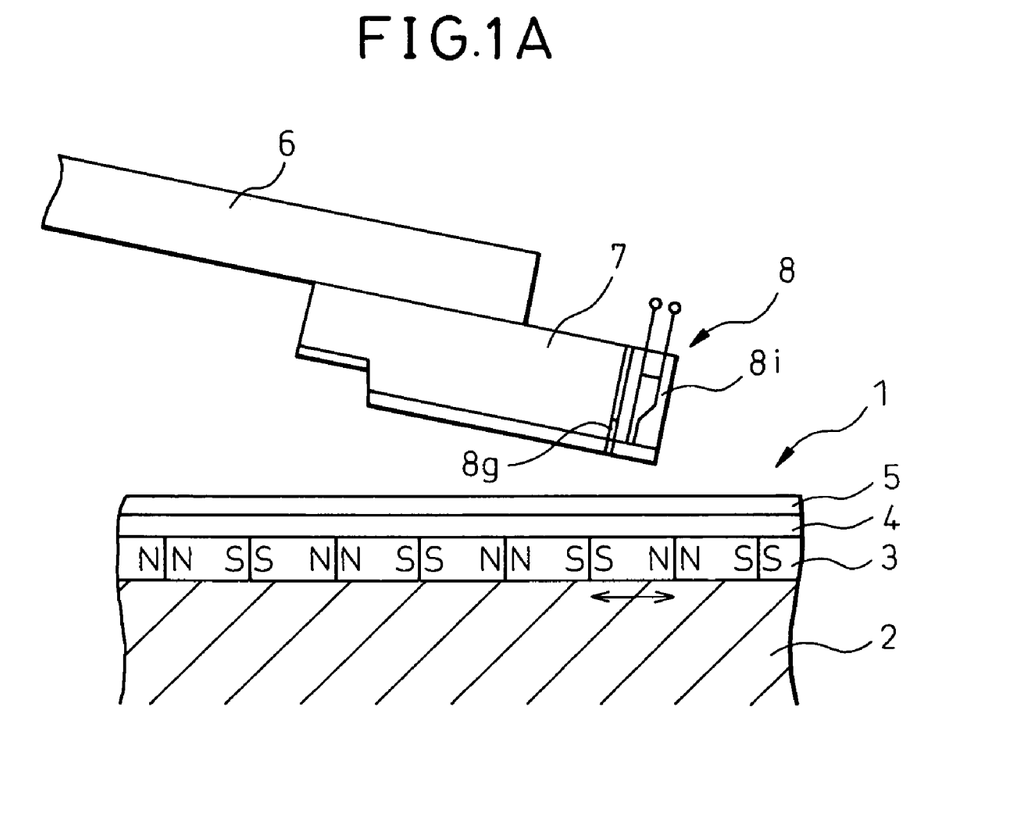
FIG. 1A is a sectional view showing the structure of the superficial layer of a conventional magnetic disk unit and the structure of a magnetic head attached to an arm.

As shown in FIG. 1A, the superficial layer of a magnetic disk 1 includes a magnetic layer 3 formed on a substrate 2. A protective film 4 made of an amorphous carbon material (diamond-like carbon (DLC)) having diamond crystals dispersed therein and a liquid lubricant film 5 are layered on the magnetic layer 3. Consequently, the superficial layer is insulating. A slider 7 attached to a rotary arm 6 movable above the magnetic disk is positioned above the magnetic disk 1, and the slider 7 bears a magnetic head 8. The magnetic head 8 is a composite head and is composed of an inductive head 8i and a giant magneto-resistive (GMR) element 8g. Normally, the inductive head 8i is used to write data on the magnetic disk 1, and the GMR element 8a is used to read data from the magnetic disk 1. The magnetic head 8 may include one of the inductive head 8i and the GMR element 8g. Moreover, the magnetic head 8 may include a magneto-resistive (MR) element or a tunnel magneto-resistive (TMR) element in place of the GMR element 8g.

Figure 1B:
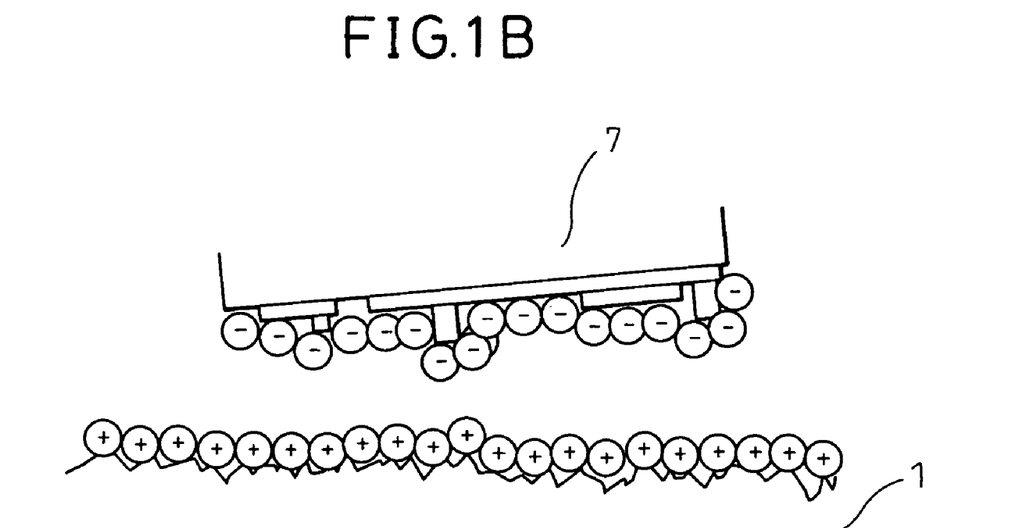
FIG. 1B is a partly enlarged view showing the states of the surfaces of a magnetic disk and of a head slider opposed to the magnetic disk on which charge appears due to the rotation of the magnetic disk.

FIG. 1B is an enlarged view of the head slider 7 that is floating and the magnetic disk 7. After the power supply of the magnetic disk unit is turned on, when the magnetic disk 1 is rotated, a positive charge appears on the surface of the magnetic disk 1 because of the friction between the surface of the magnetic disk 1 and the air. In contrast, negative charge is laid on the surface of the head slider 7 opposed to the magnetic disk 1.

As the superficial layer of the magnetic disk 1 is insulating, once the magnetic disk 1 is charged, the charge cannot escape into a spindle motor or a base (not shown). When the magnetic disk 1 is charged, the GMR element 8g of the magnetic head 8 may be broken. Otherwise, a phenomenon that the magnetic head 8, floating above the magnetic disk 1, is attracted to the magnetic disk 1 due to Coulomb force caused by the potential difference between the magnetic head 8 and magnetic disk 1, may occur. Consequently, the magnetic head 8 and magnetic disk 1 collide with each other. Eventually, the magnetic head 8 may be damaged.

As mentioned above, as far as the loading/unloading type magnetic disk unit is concerned, once the magnetic disk unit is stared, even when the power supply of the magnetic disk unit is turned off, the magnetic disk (medium) and magnetic head do not come into contact with each other. Therefore, the charge on the magnetic disk cannot escape. As the amount of charge increases, the superficial potential of the magnetic disk rises. This poses a problem in that a GMR element or an MR element included in a magnetic head may be broken due to static electricity.

The working mode of the present invention that solves the foregoing problems will be described in conjunction with exemplary embodiments.

Figure 2A:
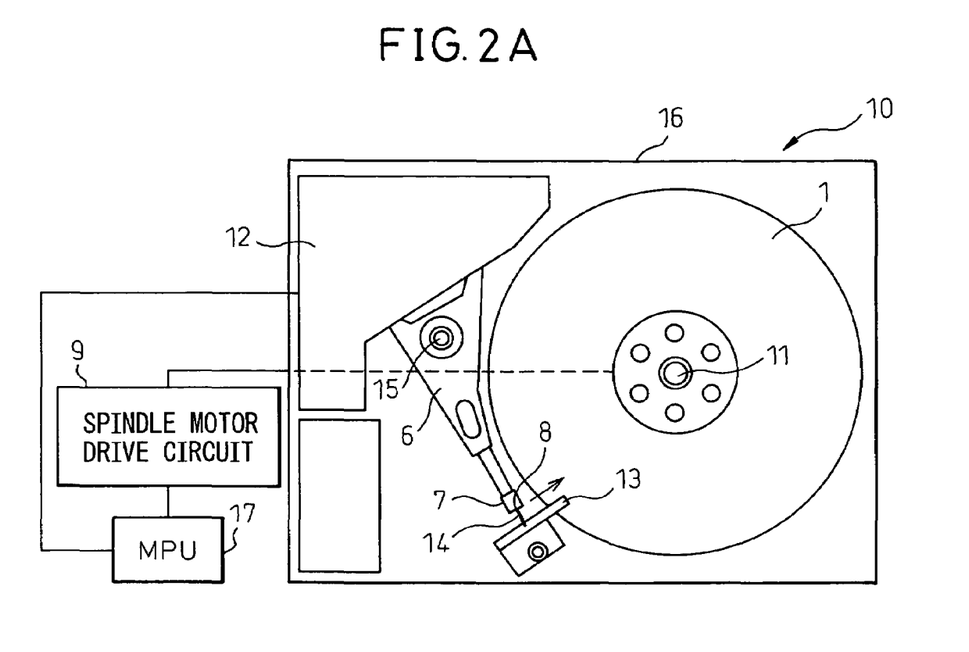
FIG. 2A is a plan view showing the state of a loading/unloading type magnetic disk unit in which a magnetic head is unloaded.
Figure 2B:
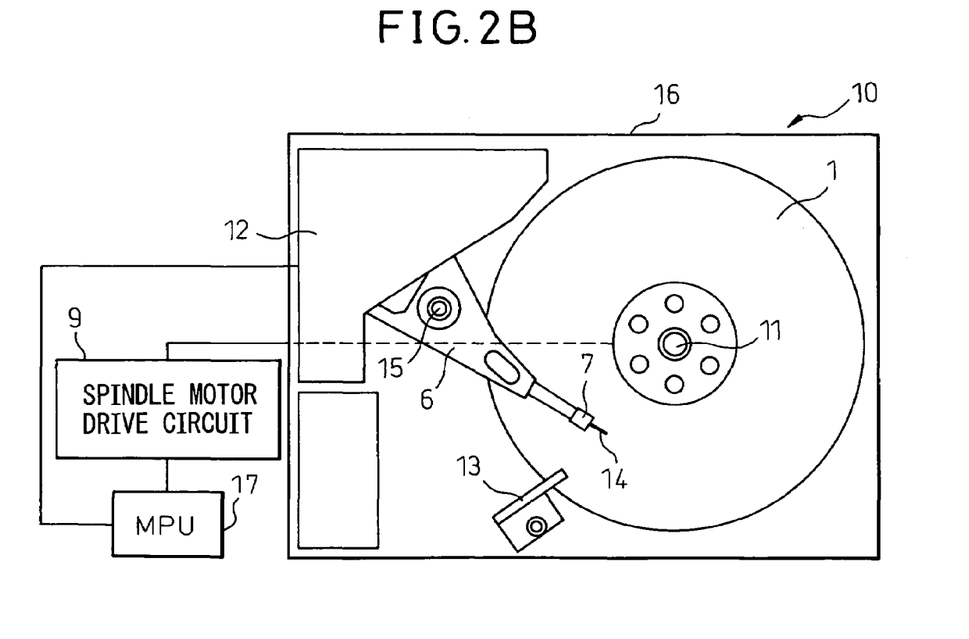
FIG. 2B is a plan view showing the state of the loading/unloading type magnetic disk unit in which the magnetic head is loaded.

FIG. 2A shows a state of a loading/unloading type magnetic disk unit 10 in which a magnetic head 8 is unloaded from a magnetic disk 1. FIG. 2B shows a state in which the magnetic head 8 is loaded onto the magnetic disk 1. The magnetic disk unit 10 has a spindle motor 11 incorporated in a housing 16 thereof. The spindle motor 11 has at least one magnetic disk 1 attached thereto.

The spindle motor 11 is driven or controlled by a spindle motor drive circuit 9 according to a command issued from a firmware program installed in a microprocessor unit (MPU) 17. Specifically, it is the MPU 17 and spindle motor drive circuit 9 that extend control to stop the rotation of the spindle motor 11 or decrease the rotational speed of the spindle motor 11. The MPU 17 and spindle motor drive circuit 9 are mounted on a circuit board that is not shown, and the circuit board is mounted on the back of the housing 16 of the magnetic disk unit 10.

Data is recorded on the magnetic disk 1. Reading or writing data from or on the magnetic disk 1 is achieved by the magnetic head 8 carried by the head slider 7. The number of head sliders 7 corresponds to the number of magnetic disks 1.

The head slider 7 is attached to the distal end of an arm 6 that can pivot around an axis of rotation 15. A coil is fixed to an end of the arm 6 opposite to the end thereof to which the head slider 7 is attached. The coil is driven by a voice coil motor 12. A ramp 13 having a tilting base is located near the outermost circumferential portion of the magnetic disk 1. A pin 14 juts out of the distal end of the head slider 7 or arm 6. When the power supply of the magnetic disk unit 10 is turned off, the arm 6 moves toward the outermost circumferential portion of the magnetic disk 1. As shown in FIG. 2A, when the pin 14 rides on the ramp 13, the magnetic head 8 is unloaded from the magnetic disk 1.

When the power supply of the magnetic disk unit 10 is turned on, the MPU 17 drives or controls the voice coil motor 12. This causes the arm 6 to move in a direction of the arrow. The arm 6 is, as shown in FIG. 2B, positioned above a desired track. In this state, the magnetic head 8 of the head slider 7 reads data from the magnetic disk 1 or writes data on the magnetic disk 1. When the head slider 7 is located above the rotating magnetic disk 1, data is written or read on or from the magnetic disk 1 with the head slider 7 floated above the magnetic disk 1.

Figure 3A:
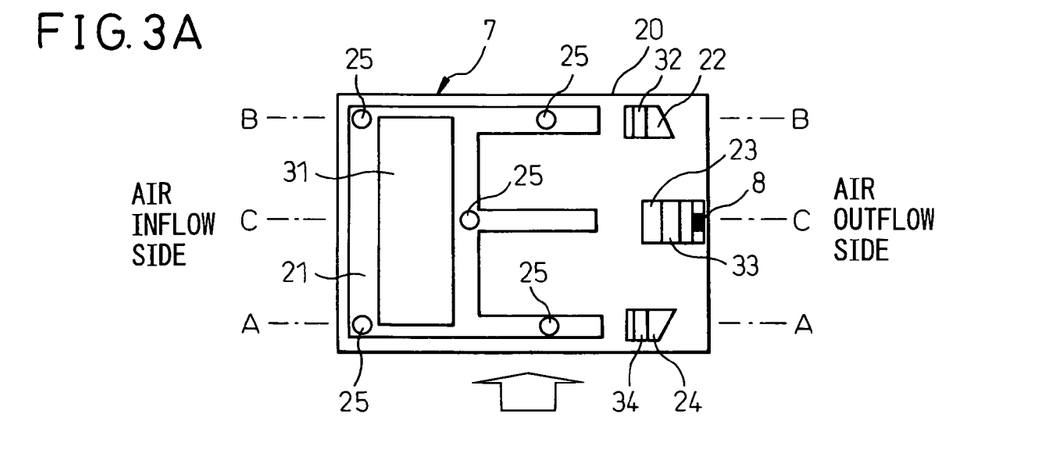
FIG. 3A is a bottom view of a slider showing the structures of the magnetic head and slider included in the loading/unloading type magnetic disk unit in accordance with the present invention.
Figure 3B:
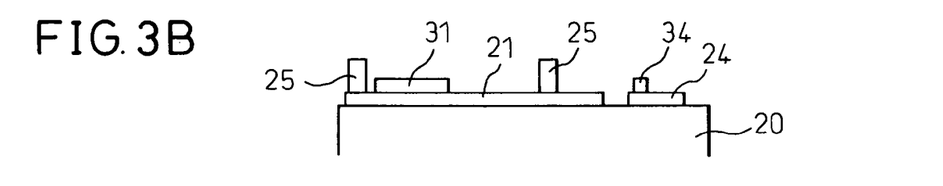
FIG. 3B is a sectional view showing an A-A cutting plane of the slider shown in FIG. 3A.
Figure 3C:
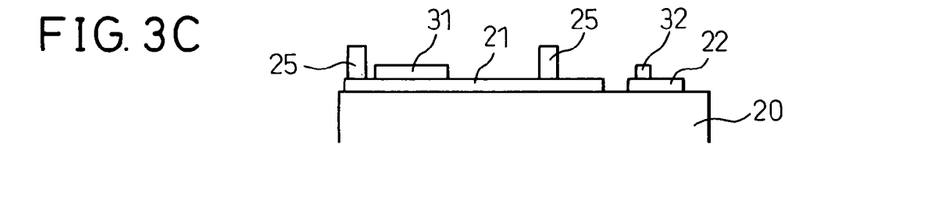
FIG. 3C is a sectional view showing a B-B cutting plane of the slider shown in FIG. 3A.
Figure 3D:
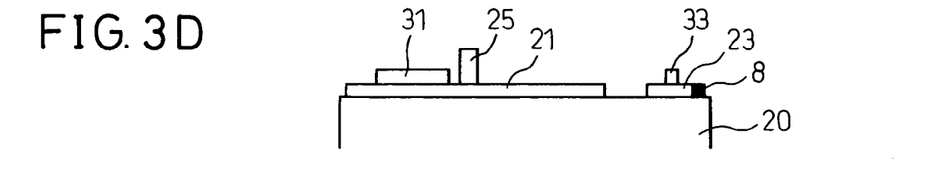
FIG. 3D is a sectional view showing a C-C cutting plane of the slider shown in FIG. 3A.
Figure 3E:
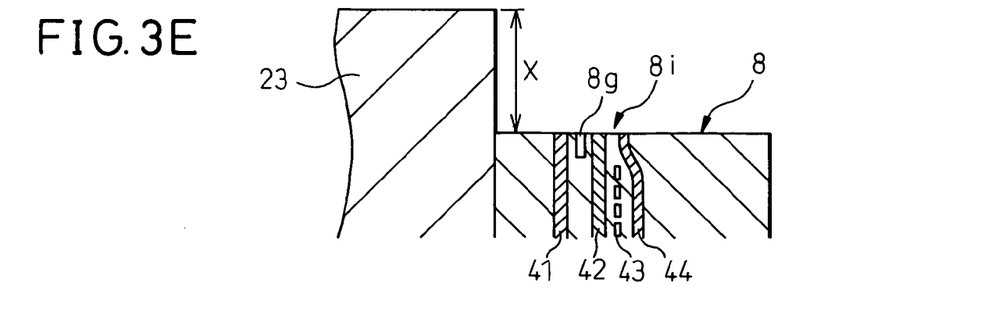
FIG. 3E is a partly enlarged sectional view showing the structure of the magnetic head.

FIG. 3A is a bottom view of the head slider 7 showing the structures of the magnetic head 8 and head slider 7 included in the loading/unloading type magnetic disk unit 10 in accordance with the present invention. Moreover, FIG. 3B is a sectional view showing an A-A cutting plane of the head slider shown in FIG. 3A. FIG. 3C is a sectional view showing a B-B cutting plane of the head slider shown in FIG. 3A. FIG. 3D is a sectional view showing a C-C cutting plane of the head slider shown in FIG. 3A. FIG. 3E is a partly enlarged sectional view showing the structure of an example of the magnetic head 8 shown in FIG. 3A.

The head slider 7 includes, as shown in FIG. 3A, a rectangular parallelepiped slider base 20. The slider base 20 is generally made of a fired substance composed of alumina and titanium carbide, that is, a highly conductive AlTic. The top of the slider base 20 is attached to the distal end of the arm 6 as shown in FIG. 2. The slider base has a negative pressure mechanism and the magnetic head 8 carried on the bottom (floating side) thereof, and opposed to the magnetic disk, floats to fly over the magnetic disk.

A first land 21 shaped substantially like a gate is formed on the floating surface of the slider base 20, which is opposed to the magnetic disk, on a side of the slider base through which air flows in during rotation of the magnetic disk. Second to fourth lands 22 to 24 are formed on the other side of the slider base through which air flows out. As shown in FIG. 3B to FIG. 3D, the heights to the top faces of the first to fourth lands 21 to 24 are identical to one another. Moreover, a first air bearing 31 is formed on the top of the first land 21. Likewise, second to fourth air bearings 32 to 34 are formed on the tops of the second to fourth lands. The tops of the first to fourth air bearings 31 to 34 are flat, and the heights thereof from the slider base 20 are, as shown in FIG. 3B to FIG. 3D, identical to one another.

The magnetic head 8 is located near the third land 23 on the air outflow side of the slider base 20. The magnetic head 8 included in the present embodiment is, as shown in FIG. 3E, a composite head composed of a GMR element 8g and an inductive head 8i. A step X between the magnetic head 8 and third land 23 has normally a height of approximately 5 nm. The GMR element 8g incorporated in the magnetic head 8 includes a lower magnetic layer 41 and an upper magnetic layer 42. Moreover, the inductive head 8i includes a coil conductor 43 and a lower magnetic layer 44. The GMR element 8g and inductive head 8i are formed in an alumina protective film.

Furthermore, in the present embodiment, although the magnetic disk unit is of the loading/unloading type, a pad 25 that is a projection whose height from the slider base 20 is larger than that of the first air bearing 31 is formed at a plurality of points on the first land 21 on the head slider 7. The number of pads 25 included in the present embodiment is five. The pads are located at the four corners of the first land 21 and in the center thereof. In the present embodiment, the five pads 5 have the same height. An embodiment having the pads 25, which are located on the air inflow side, made higher than the pads located on the air outflow side is conceivable. The reason will be described later.

Figure 4A:
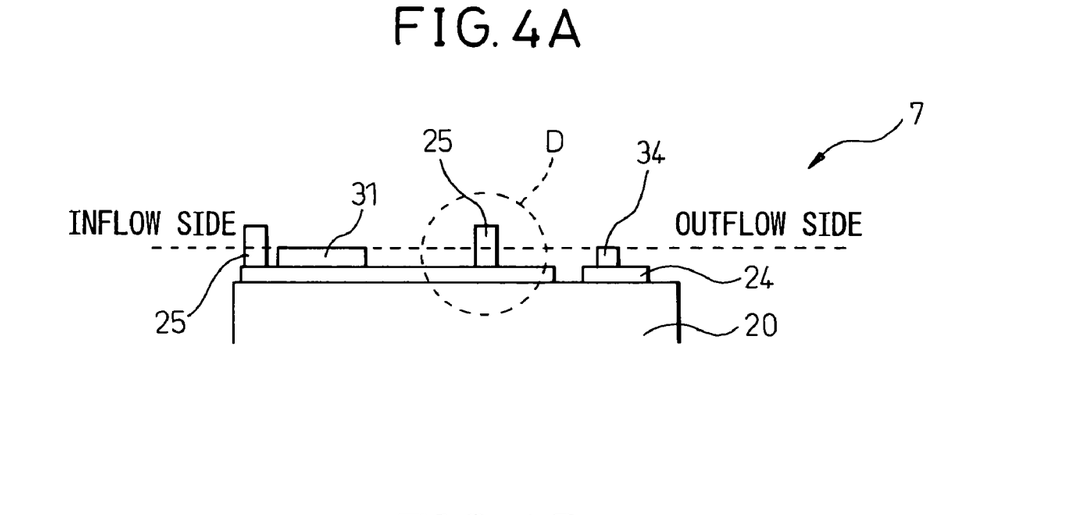
FIG. 4A is an explanatory diagram that uses the sectional view showing the A-A cutting plane of the slider shown in FIG. 3A to show the height of a new projection included in the present invention in comparison with the height of a step on the slider.
Figure 4B:
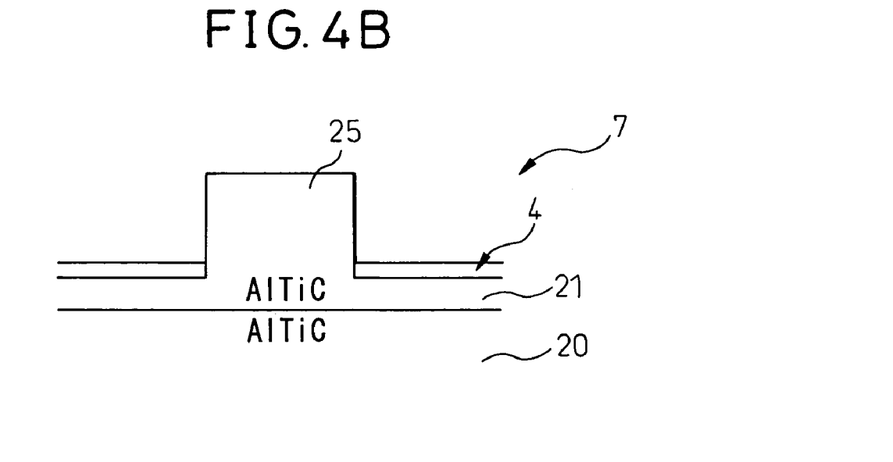
FIG. 4B is a sectional view showing the structure of a projection, which is shown in area D in FIG. 4A, adopted in the present invention.
Figure 4C:
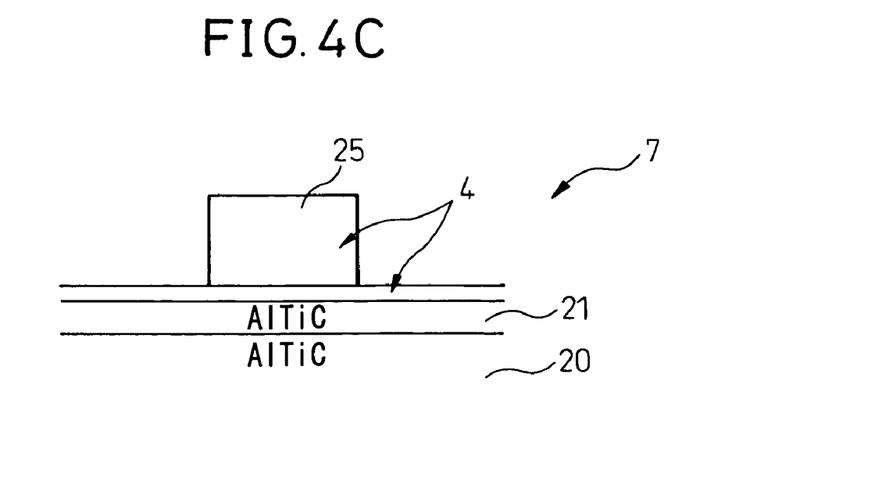
FIG. 4C is a sectional view showing the structure of the projection, which is shown in area D in FIG. 4A, adopted in a prior art.

FIG. 4A is a sectional view showing the same region as FIG. 3B. FIG. 4B is a partly enlarged sectional view of area D in FIG. 4 showing the present invention. FIG. 4C is a partly enlarged sectional view of the area D in FIG. 4A showing the conventional CSS type magnetic disk unit. The slider base 20 of the head slider 7 is made of AlTic, and the first land 21 is also made of AlTic. The superficial layer of the first land 21 includes a protective film 4 made of diamond-like carbon (DLC).

In the conventional CSS type magnetic disk unit, when the rotation of a magnetic disk is stopped, the head slider 7 is merely placed on the magnetic disk. The pads 25 jutted out of the first land 21 are, as shown in FIG. 4C, made of the same material as the protective film 4 made of DLC. On the other hand, the pads 25 jutted out of the first land 21 included in the present invention are, as shown in FIG. 4B, made of AlTic that is a material made into the first land 21 layered under the protective film 4 made of DLC.

The reason why the pads 25 jutted out of the first land 21 are made of AlTic is that AlTic is more highly conductive than DLC. When the pads 25 are made of AlTic, if the pads 25 come into contact with a magnetic disk, a charge on the magnetic disk readily escapes. As long as the proportion of carbon to DLC may be able to be changed in order to improve the conductivity of DLC, the structure shown in FIG. 4C is feasible.

Figure 5A:
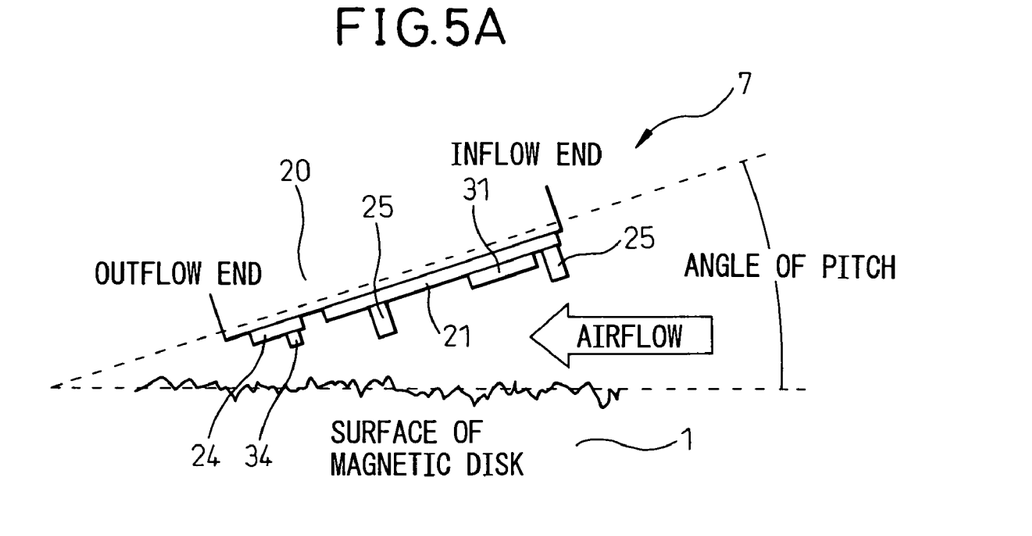
FIG. 5A is a side view showing the floating state of the slider shown in FIG. 3A attained when the magnetic disk is rotated at a normal speed.

FIG. 5A shows the floating state of the head slider 7, which is shown in FIG. 3A, attained when the magnetic disk 1 is rotated at a normal rotating speed. When the magnetic disk 1 is rotated at the normal rotating speed, the head slider 7 is tilted at a predetermined angle of pitch and floats above the magnetic disk 1. Along with the elapse of time, charge begins to appear on the magnetic disk 1 due to friction against the air.

As an amount of charge on the magnetic disk 1 increases, it is possible that an MR element, such as a GMR element included in the magnetic head, may be broken. According to the present invention, when a predetermined amount of charge appears on the magnetic disk 1, charge removal is performed. The charge removal is achieved by the MPU 17, which is described in conjunction with FIG. 2A and FIG. 2B, according to a program. For control of the charge removal, the spindle motor drive circuit 9 is controlled based on a command issued from the MPU 17, and the rotating speed of the spindle motor 11 is decreased to be lower than the normal rotating speed. Otherwise, the rotation of the spindle motor 11 stops. This control sequence will be described later.

Decreasing the rotating speed of the spindle motor 11 in the course of charge removal control may be achieved when the head slider 7 is located at any position on the magnetic disk 1. In order to avoid contact of the head slider 7 with a data zone, after the head slider 7 is moved to a CSS zone by actuating the rotary arm 6, the rotating speed of the spindle motor 11 may be decreased.

Figure 5B:
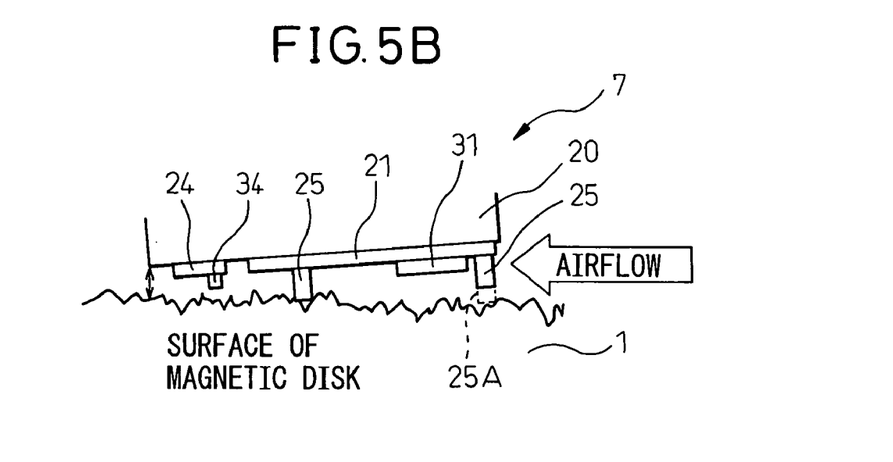
FIG. 5B is a side view for explaining how the projection of the slider comes into contact with a magnetic disk when the rotation of the magnetic disk is decelerated so that the magnetic disk is rotated at a low speed.

When the rotating speed of the magnetic disk 1 is decreased during charge removal control, that is, when the rotation of the magnetic disk 1 is decelerated, the airflow around the head slider 7 is weakened. This brings about a decrease in a height of floating by which the head slider 7 floats above the magnetic disk 1. Eventually, the pads 25 formed on the head slider 7 come into contact with the surface of the magnetic disk 1 as shown in FIG. 5B.

Figure 5C:
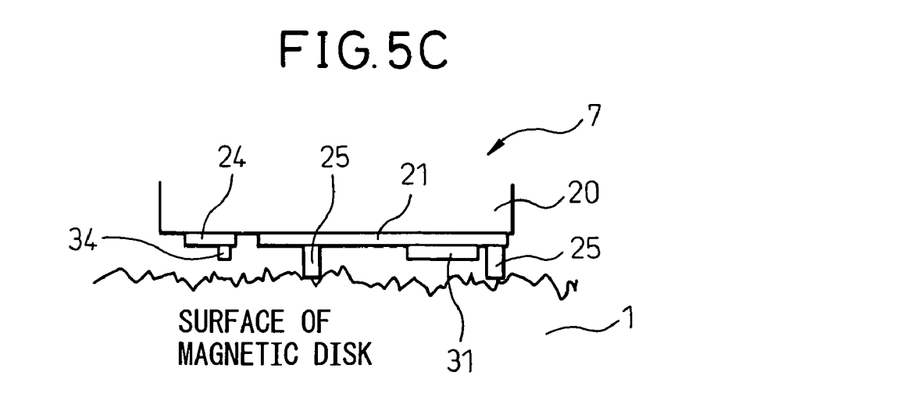
FIG. 5C is a side view showing the state of the slider shown in FIG. 3A landing on a magnetic disk whose rotation is stopped.

Thereafter, when the rotation of the magnetic disk 1 stops, all the pads 25 formed on the head slider 7 come into contact with the surface of the magnetic disk 1 as shown in FIG. 5C. Consequently, the head slider 1 comes to a standstill on the magnetic disk 1. In this state, the head slider 7 is in contact with the magnetic disk 1 via the five pads 5 jutted out of the first to fourth lands thereof. A charge on the magnetic disk 1 therefore flows into the slider base 20 by way of the five pads 25, and then flows into the housing of the magnetic disk unit by way of the arm, not shown. Thus, the charge on the magnetic disk 1 is removed.

After the charge on the magnetic disk 1 is eliminated, when the magnetic disk 1 is rotated again, the head slider 7 floats above the magnetic disk 1 along with a rise in the rotating speed and returns to the state shown in FIG. 5A. After the power supply of the magnetic disk unit is turned on in order to rotate the magnetic disk, the magnetic disk is charged for approximately one hour. Consequently, in order to remove the charge from the magnetic disk, the head slider should be brought into contact with the magnetic disk at intervals of about one hour.

By referring to the flowcharts of FIG. 6 to FIG. 9, some examples of a control sequence for removing charge from a magnetic disk will be described below. A description will be made on the assumption that the head slider is located at any position on a magnetic disk and charge removal control is implemented at that position. When charge removal control is implemented in a CSS zone on a magnetic disk, control for moving the head slider to the CSS zone and control for returning the head slider to the original position after completion of charge removal control are added to the charge removal control. A description of the control will be omitted.

Figure 6:
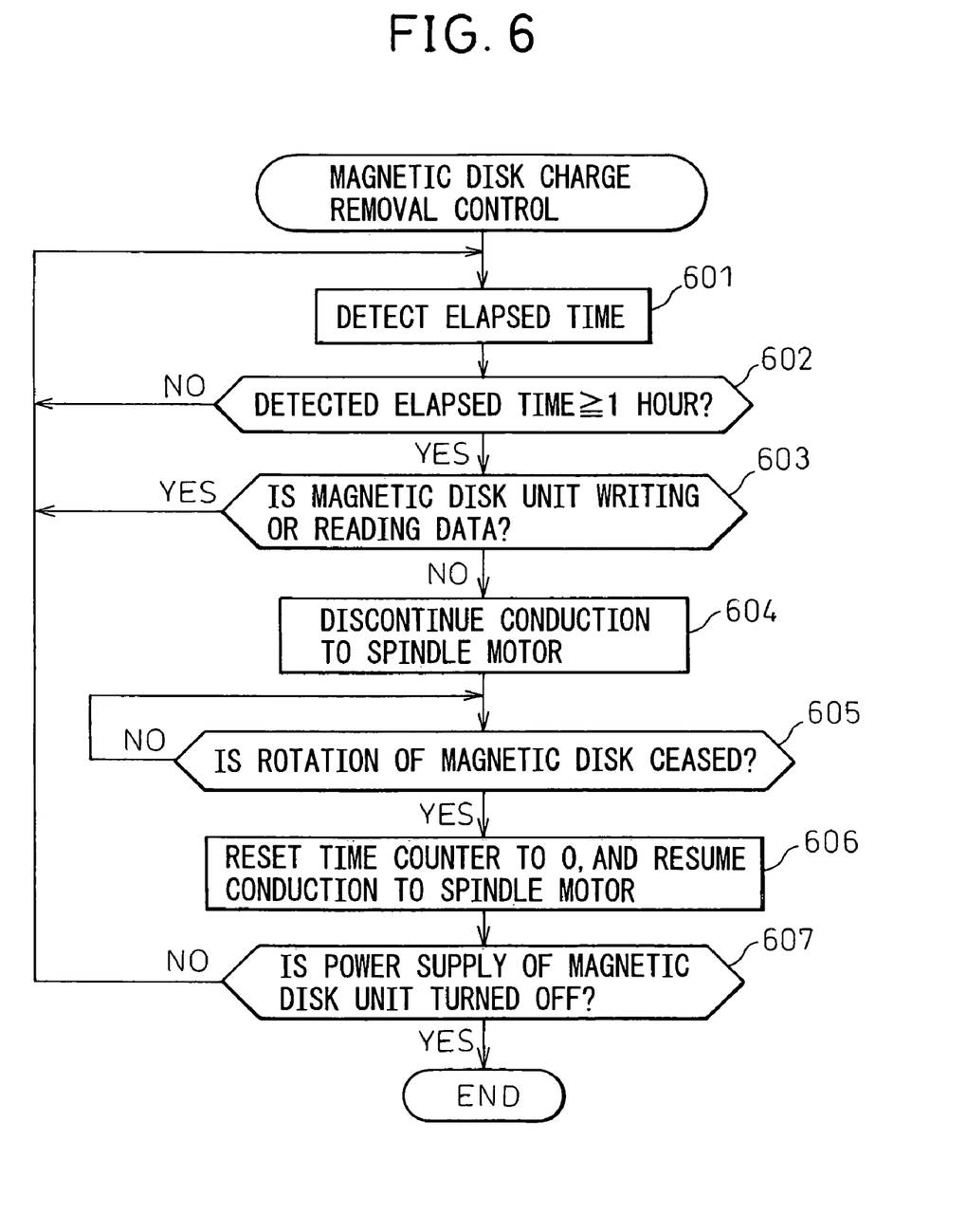
FIG. 6 is a flowchart describing a control sequence employed in the first embodiment for cyclically bringing a magnetic head into contact with a magnetic disk so as to remove a charge on the magnetic disk.

FIG. 6 is a flowchart describing a control sequence employed in the first embodiment in order to cyclically bring a magnetic head into contact with a magnetic disk so as to remove charge laid on the magnetic disk. In the first embodiment, the control sequence is initiated after the power supply of the magnetic disk unit is turned on. Conduction of electricity to the spindle motor is discontinued at regular intervals, for example, at intervals of one hour in order to stop the rotation of the magnetic disk. When the magnetic disk is stopped, the head slider lands on the magnetic disk in order to remove charge laid on the magnetic disk. After the power supply of the magnetic disk unit is turned off, the control sequence is terminated.

At step 601, the number of times by which a specific cycle is repeated is counted in order to detect an elapsed time. The specific cycle need not be repeated at intervals of as short as one sec but may be repeated at intervals of about one min. At step 602, a decision is made on whether the detected elapsed time is one hour or more. If the elapsed time falls below one hour, control is returned to step 601, and detecting the elapsed time by counting the number of times by which the specific cycle is repeated is continued. When the detected elapsed time is one hour or more, control is passed to step 603.

At step 603, a decision is made on whether the disk unit is writing or reading data. If the disk unit is writing or reading data, removal of charge from the magnetic disk is not performed but control is returned to step 601. Steps 601 to 603 are repeated. On the other hand, if the disk unit is not decided to be writing or reading data, control is passed to step 604. Conduction to the spindle motor is discontinued.

When conduction to the spindle motor is discontinued, the rotation of the spindle motor is decelerated. At step 605, a decision is made on whether the rotation of the magnetic disk has stopped. If the rotation of the magnetic disk is not stopped, the decision making of step 605 is repeated. If the rotation of the magnetic disk has stopped, control is passed to step 606. If the rotation of the magnetic disk has stopped, the head slider including the magnetic head lands on the magnetic disk. This state corresponds to the state shown in FIG. 5C. The pads jutted out of the slider head are landed on the magnetic disk. Consequently, a charge on the magnetic disk flows into the housing of the disk unit by way of the pads, head slider, and rotary arm. Thus, the charge is removed from the magnetic disk.

As mentioned above, when the rotation of the magnetic disk is stopped, charge laid on the magnetic disk is removed. At step 606, the time counter is reset to 0, and conduction to the spindle motor is resumed. At step 607, a decision is made on whether the power supply of the magnetic disk unit is turned off. If the power supply is turned off, the routine is terminated. If the power supply is not turned off, control is passed to step 601. The aforesaid charge removing actions are repeated.

In the aforesaid first embodiment, when the detected elapsed time becomes one hour or more, if the disk unit is writing or reading data, removal of charge from the magnetic disk is not performed but control is returned to step 601. Steps 601 to 603 are then repeated until the disk unit completes writing or reading of data. Alternatively, when the detected elapsed time becomes one hour or more, data writing or reading performed by the disk unit may be forcibly suspended in order to discontinue conduction to the spindle motor. Thus, charge removal may be performed without fail.

When the detected elapsed time is one hour or more, if the disk unit is writing or reading data, removal of charge from the magnetic disk is not performed but control is returned to step 601. Steps 601 to 603 are then repeated. If the data writing or reading state of the disk unit continues for a prolonged period of time, a wait state may be held for a certain time. When the certain time has elapsed, the data writing or reading performed by the disk unit may be forcibly suspended in order to discontinue conduction to the spindle motor. Charge removal may then be performed. This mode will be described as the second embodiment in conjunction with FIG. 7.

Figure 7:
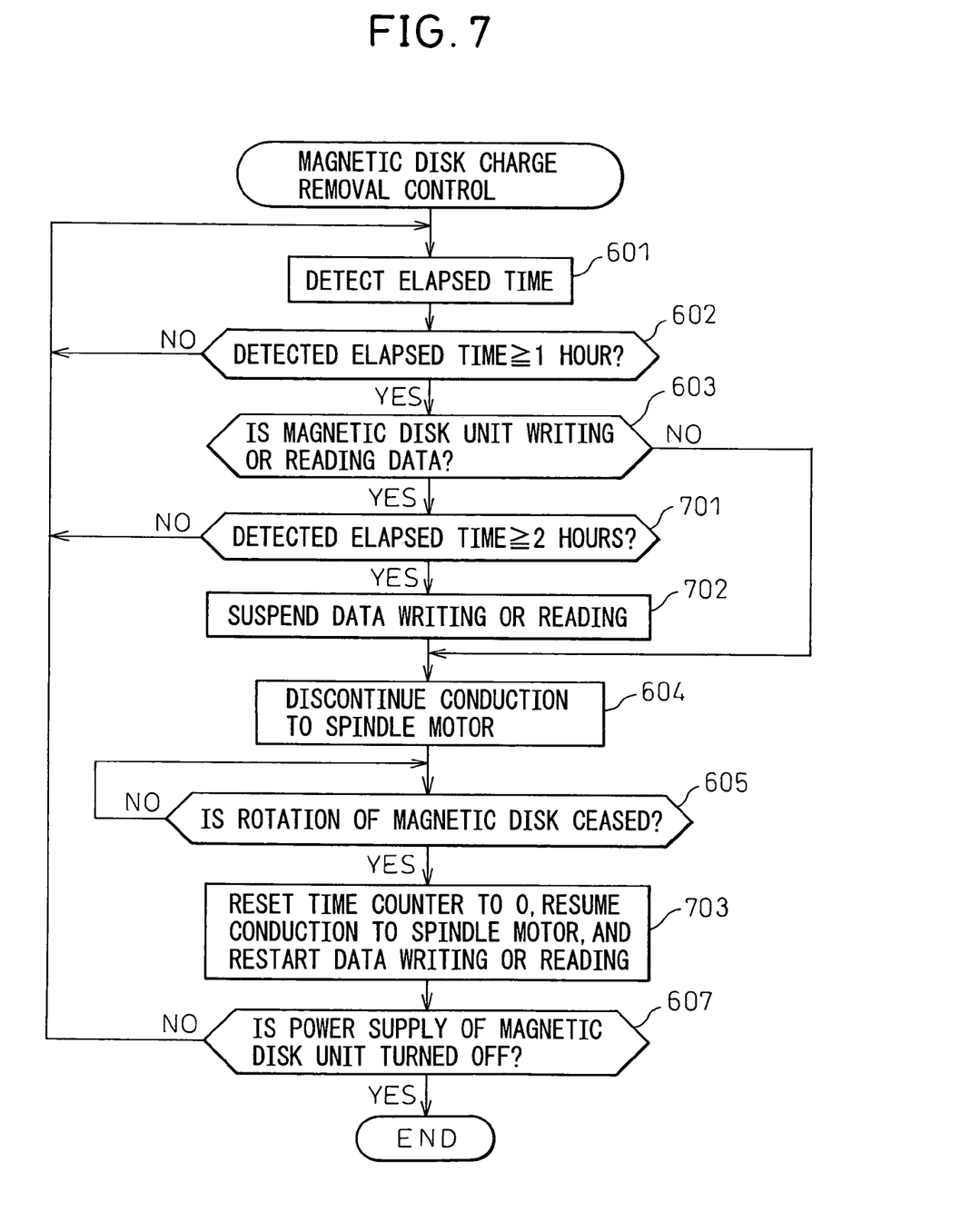
FIG. 7 is a flowchart describing a control sequence employed in the second embodiment for cyclically bringing a magnetic head into contact with a magnetic disk so as to remove a charge on the magnetic disk.

Steps included in the second embodiment will be described by assigning the same step numbers to steps identical to those included in the first embodiment. At step 601, the number of times by which a specific cycle is repeated is counted in order to detect an elapsed time. At step 602, a decision is made on whether the detected elapsed time is one hour or more. If the detected elapsed time falls below one hour, control is returned to step 601 and detecting the elapsed time by counting the number of times by which the specific cycle is repeated is continued. When the detected elapsed time comes to one hour or more, control is passed to step 603.

At step 603, a decision is made on whether the disk unit is writing or reading data. If the disk unit is neither writing nor reading data, control is passed to step 604. If the disk unit is writing or reading data, control is passed to step 701. A decision is made on whether the detected elapsed time signifies that a certain time, for example, two hours or more has elapsed since the previous charge removal. If two hours or more has not elapsed since the previous charge removal, control is returned to step 601. If two hours or more has elapsed since the previous charge removal, control is passed to step 702. The data writing or reading performed by the disk unit is forcibly suspended, and control is passed to step 604. In the present embodiment, the criterial time adopted at step 701 is set to two hours. As long as the criterial time is longer than one hour, it is not limited to any specific value. The criterial time may be 1.2 hours or 1.5 hours.

At step 604, conduction to the spindle motor is discontinued. At step 605, a decision is made on whether the rotation of the magnetic disk has stopped. If the rotation of the magnetic disk has not stopped, the decision making of step 605 is repeated. If the rotation of the magnetic disk has stopped, control is passed to step 703. When the rotation of the magnetic disk has stopped, a charge on the magnetic disk flows into the housing of the disk unit by way of the pads, head slider, and rotary arm. Thus, the charge is removed from the magnetic disk.

At step 703, the time counter is reset to 0 and conduction to the spindle motor is resumed. Moreover, the data writing or reading may be performed when the disk unit is restarted. At step 607, a decision is made on whether the power supply of the magnetic disk unit is turned off. If the power supply is turned off, the routine is terminated. If the power supply is not turned off, control is passed to step 601. The aforesaid charge removing actions are repeated.

In the aforesaid first and second embodiments, the rotation of a magnetic disk is stopped in order to cause charge laid on the magnetic disk to escape toward a main body of a magnetic disk unit via a head slider. However, if conduction to the spindle motor is discontinued in order to remove charge laid on the magnetic disk, the rotation of the magnetic disk is decelerated. This causes a height, by which the head slider floats, to decrease. Consequently, before the rotation of the magnetic disk stops, the head slider comes into contact with the magnetic disk. The contact causes the charge laid on the magnetic disk to escape toward the main body of the magnetic disk unit via the head slider. Therefore, before the rotation of the magnetic disk stops, conduction to the spindle motor may be restored. This mode will be described as the third embodiment in conjunction with the flowchart of FIG. 8.

Figure 8:
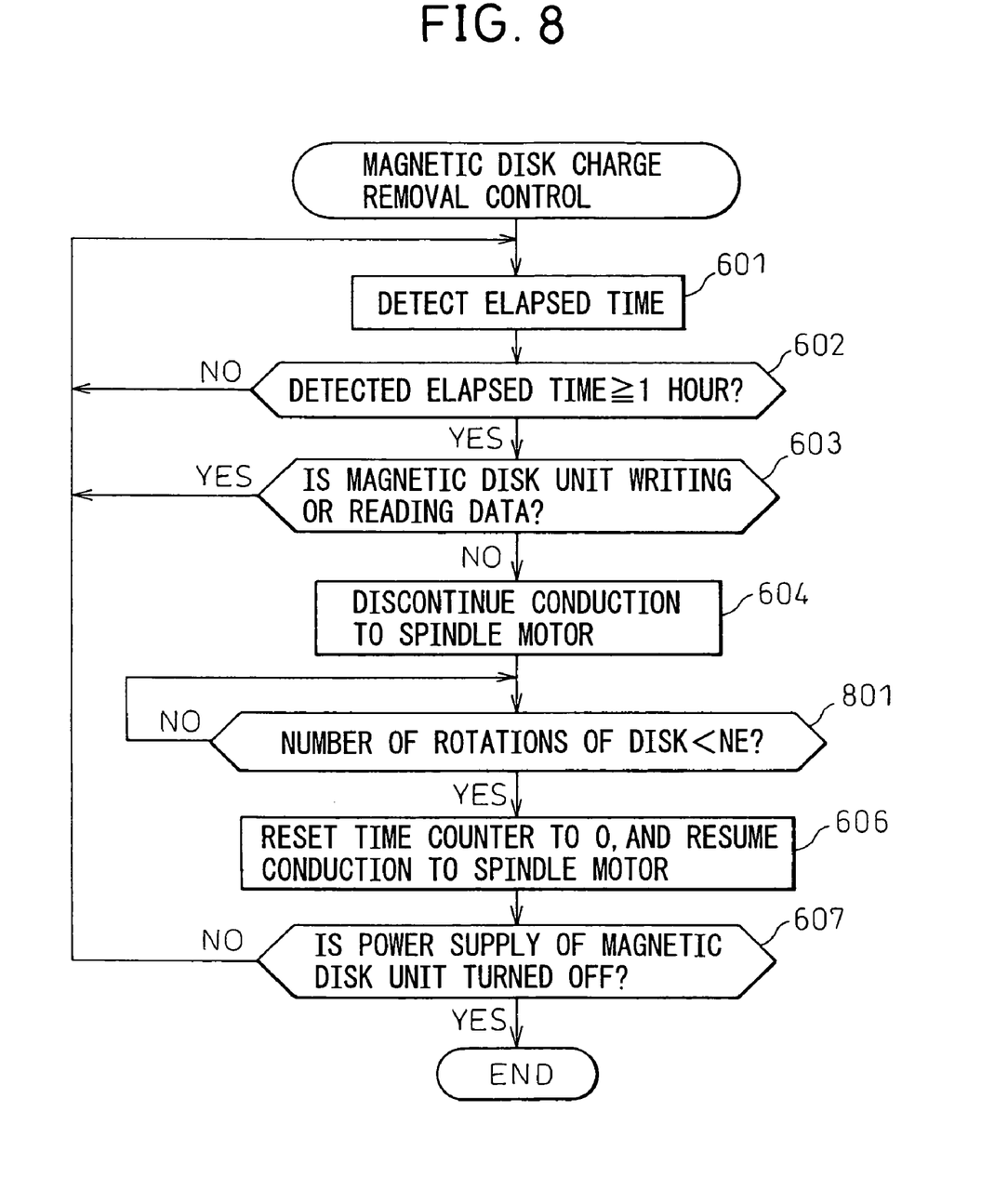
FIG. 8 is a flowchart describing a control sequence employed in the third embodiment for cyclically bringing a magnetic head into contact with a magnetic disk so as to remove a charge on the magnetic disk.

The same reference numerals will be assigned to steps included in the third embodiment and identical to those of the first embodiment. The description of the third embodiment will be simplified. A control sequence from step 601 to step 604 is identical to that employed in the first embodiment. Only when the elapsed time detected by counting the number of times by which the specific cycle is repeated comes to one hour or more and the disk unit is neither writing nor reading data, conduction to the spindle motor is discontinued at step 604.

Assuming that conduction to the spindle motor is discontinued and the rotation of a magnetic disk is decelerated, the number of rotations to be made by the magnetic disk which causes a height, by which the head slider floats, to decrease and which brings the head slider into contact with the magnetic disk is already known. Assuming that NE denotes the number of rotations to be made by the magnetic disk which brings the head slider into contact with the magnetic disk, a decision is made at step 801 on whether the number of rotations made by the disk is below the NE value. If the number of rotations made by the disk is equal to or larger than the NE value, a wait state is held until the number of rotations made by the disk decreases. When the number of rotations made by the disk is below the NE value, control is passed to step 606.

At step 606, the time counter is reset to 0, and conduction to the spindle motor is resumed. At step 607, a decision is made on whether the power supply of the magnetic disk unit is turned off. If the power supply is turned off, the routine is terminated. If the power supply is not turned off, control is passed to step 601. The aforesaid charge removing actions are repeated.

As indicated with a dashed line in FIG. 5B, the pads 25 located on the side of the head slider 7 through which air flows in may be provided with an extension 25A. In this case, when the rotation of the magnetic disk is decelerated, if a magnitude of float by which the heat slider floats is decreased, all the pads 25 come into contact with the magnetic disk nearly concurrently. Thus, smooth removal of a charge on the magnetic disk may be achieved.

Figure 9:
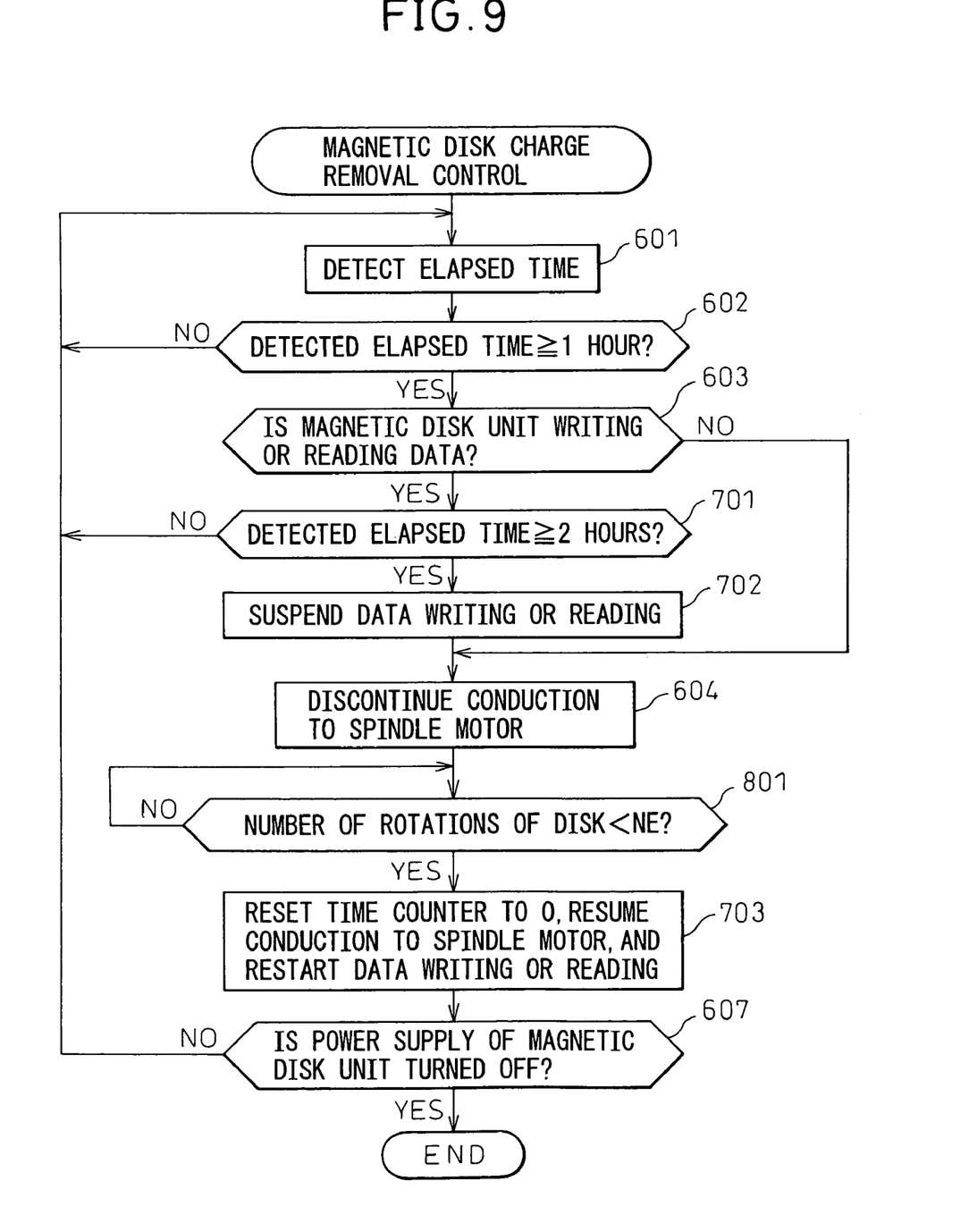
FIG. 9 is a flowchart describing a control sequence employed in the fourth embodiment for cyclically bringing a magnetic head into contact with a magnetic disk so as to remove a charge on the magnetic disk.

The same difference as the difference of the first embodiment from the second embodiment may be adapted to the third embodiment. Specifically, after the detected elapsed time becomes one hour or more, if the disk unit is writing or reading data, a wait state is held for a certain time. However, when the certain time has elapsed, the data writing or reading performed by the disk unit may be forcibly suspended in order to discontinue conduction to the spindle motor. The charge removal employed in the third embodiment may then be performed. FIG. 9 describes the mode including this control sequence as the fourth embodiment.

The fourth embodiment is different from the second embodiment only in a point that step 605 is replaced with step 801 employed in the third embodiment. The same steps as those employed in the second embodiment will be assigned the same step numbers and the description thereof will be omitted.

Figure 10A:
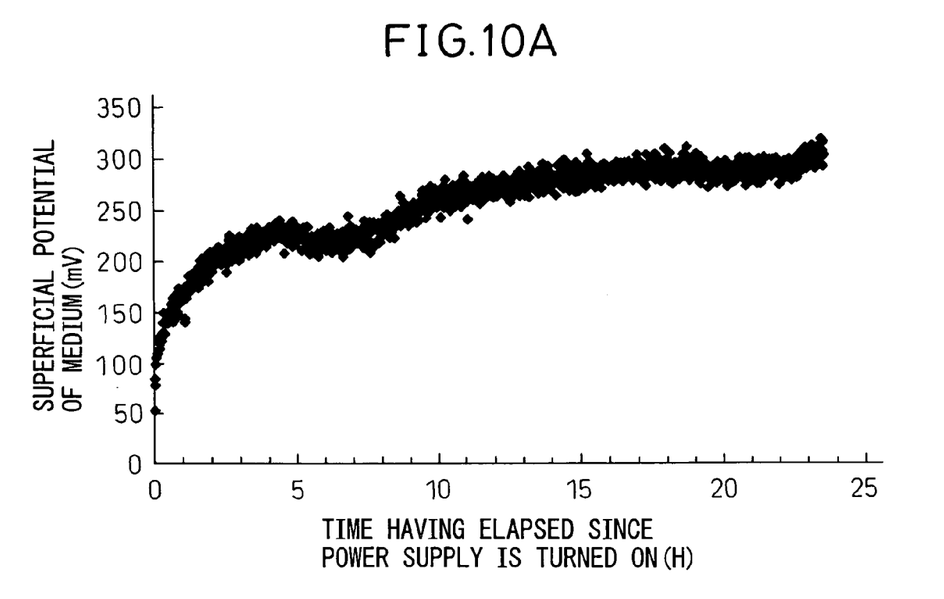

FIG. 10A shows a transition in the superficial potential of a magnetic disk, which is caused by a charge on the magnetic disk, in relation to a time having elapsed since the power supply of the conventional loading/unloading type magnetic disk unit is turned on. In the magnetic disk unit, when one hour has elapsed since the power supply is turned on, the superficial potential of the magnetic disk rises due to a charge on the magnetic disk. The rise in the superficial potential of the magnetic disk poses the problems described previously.

Figure 10B:
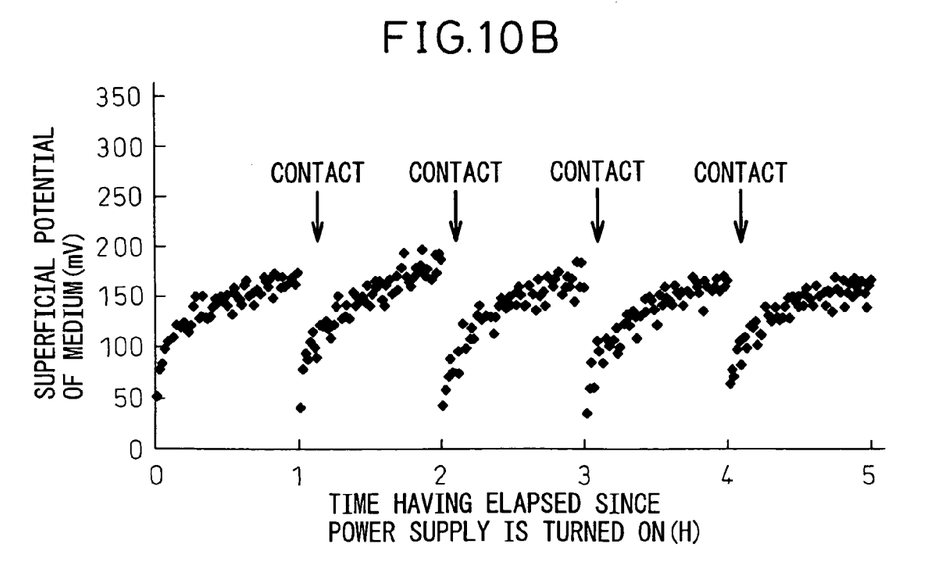

In contrast, according to the present invention, after the power supply of the loading/unloading type magnetic disk unit is turned on, whenever a predetermined time of, for example, one hour has elapsed, the rotation of the magnetic disk is stopped, or the number of rotations thereof is decreased until the head slider comes into contact with the magnetic disk. Consequently, a charge on the magnetic disk is removed. Thus, as shown in FIG. 10B, the superficial potential of the magnetic disk will not be raised by a charge on the magnetic disk. In the loading/unloading type magnetic disk unit according to the present invention, an event that an MR element, a GMR element, or a TMR element included in the magnetic head is broken due to static electricity will not occur.

In the aforesaid embodiments, the present invention is applied to a magnetic disk unit. However, the present invention is not limited to the magnetic disk unit but may be applied to any other storage device such as a magneto-optical disk unit.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A disk unit comprising:
a motor that rotates or drives at least one disk;
a head slider attached to the distal end of an arm movable above the disk;
a loading/unloading mechanism that loads or unloads the head slider onto or from the disk;
a control device that, when the disk unit is in operation, discontinues conduction of electricity to the motor after every elapse of a predetermined time, and brings the head slider into contact with the disk so that a charge on the disk will escape through the arm; and
at least one projection made of a highly conductive material and jutted out of the surface of the head slider opposed to the disk;
wherein the control device brings the projections into contact with the disk so that a charge on the disk will escape through the arm.

2. The disk unit according to claim 1,
wherein the control device discontinues conduction to the motor at the time when the magnetic head is neither writing nor reading data on or from the magnetic disk after the elapse of the predetermined time.

3. The disk unit according to claim 1,
wherein after the predetermined time elapses, if the magnetic head is still writing or reading data on or from the magnetic disk, the control device suspends the writing or reading of data on or from the magnetic disk, which is performed by the magnetic head, after further elapse of the predetermined time, and discontinues conduction to the motor.

4. The disk unit according to claim 1, wherein: the control device discontinues conduction to the motor so as to fully stop the rotation of the magnetic disk; and, after all the projections land on the magnetic disk, the control device resumes conduction to the motor.

5. The disk unit according to claim 4, wherein the control device checks the number of rotations made by the magnetic disk so as to detect the timing when at least one projection comes into contact with the magnetic disk.

6. The disk unit according to claim 5, wherein among the projections, projections located on a side of the slider through which air flows in are formed to be higher than projections located on the other side thereof through which air flows out so that all the projections will nearly concurrently come into contact with the magnetic disk along with the decrease in a magnitude of float by which the slider floats.

7. The disk unit according to claim 1, wherein: the control device discontinues conduction to the motor so as to decelerate the rotation of the magnetic disk; and after a height by which the slider floats above the magnetic disk decreases, when at least one projection comes into contact with the magnetic disk, the control device resumes conduction to the motor.

8. The disk unit according to claim 1, wherein at least one projection is located at a position allowing the projection to first come into contact with the magnetic disk along with the decrease in the height by which the slider floats.

9. The disk unit according to claim 1, wherein the slider includes a base member made of a conductive material and an insulating member layered on the surface of the base member opposed to the magnetic disk, and the projections are made of the same conductive material as the base member.

10. The disk unit according to claim 9, wherein the slider is made of an AlTic material, and the projections are also made of AlTic.

11. The disk unit according to claim 9, wherein the projections are produced by increasing a content of carbon in the insulating member layered on the surface of the slider opposed to the magnetic disk.

12. A control device for a disk unit including a motor that rotates or drives at least one disk, a head slider attached to the distal end of an arm movable above the disk, and a loading/unloading mechanism that loads or unloads the head slider onto or from the disk, the control device comprising:
a circuit that detects whether the disk unit is in operation;
a circuit that detects the elapse of a predetermined time when the disk unit is in operation; and
a circuit that discontinues conduction to the motor after every elapse of the predetermined time so that the head slider will come into contact with the disk so as to cause a charge on the disk to escape through the arm;
wherein at least one projection made of a highly conductive material is jutted out of the surface of the head slider opposed to the disk, and the conduction discontinuing circuit discontinues conduction to the motor so that the projections will come into contact with the disk so as to cause charge laid on the disk to escape through the arm.

13. The control device according to claim 12, further comprising:
a circuit that, after conduction to the motor is discontinued, fully stops the rotation of the disk and detects that all the projections land on the disk; and
a circuit that, after all the projections are detected to land on the disk, resumes conduction to the motor.

14. The control device according to claim 12, further comprising:
a circuit that, after conduction to the motor is discontinued in order to decelerate the rotation of the disk, detects the timing when the height by which the slider floats above the disk decreases to such an extent that at least one projection comes into contact with the disk; and
a circuit that, after the timing when at least one projection comes into contact with the disk is detected, resumes conduction to the motor.

15. The control device according to claim 12,
wherein the slider includes a base member made of a conductive material and an insulating member layered on the surface of the base member opposed to the disk, and the projections are made of the same conductive material as the base member.

* * * * *